US005670072A

United States Patent [19]

Offer et al.

[11] Patent Number: 5,670,072
[45] Date of Patent: Sep. 23, 1997

[54] METHOD AND APPARATUS FOR JOINING METAL COMPONENTS WITH MITIGATION OF RESIDUAL STRESSES

[75] Inventors: Henry Peter Offer, Los Gatos, Calif.; Lawrence Michael Grycko, Lockport, Ill.

[73] Assignee: General Electric Company, San Jose, Calif.

[21] Appl. No.: 231,614

[22] Filed: Apr. 22, 1994

[51] Int. Cl.⁶ ................................................. B23K 9/167
[52] U.S. Cl. ....................... 219/137 R; 219/75; 219/136; 219/145.21
[58] Field of Search ................................ 219/74, 75, 136, 219/137 R, 145.21, 146.21

[56] References Cited

U.S. PATENT DOCUMENTS

| 2,809,277 | 10/1957 | Breymeier .................... 219/74 |
| 2,905,805 | 9/1959 | McElrath et al. ................ 219/74 |
| 3,328,556 | 6/1967 | Nelson et al. ................... 219/137 |
| 3,715,561 | 2/1973 | Hammarlind .................. 219/145.21 |
| 3,825,712 | 7/1974 | Gibbs . |
| 4,019,018 | 4/1977 | Oishi et al. ................... 219/137 R |
| 4,309,590 | 1/1982 | Stol ............................... 219/136 |
| 4,455,471 | 6/1984 | Ecer et al. .................... 219/145.21 |
| 4,491,715 | 1/1985 | Voronin et al. .................. 219/74 |
| 4,591,685 | 5/1986 | Hinger et al. ................... 219/74 |
| 5,003,150 | 3/1991 | Stricklen ......................... 219/75 |
| 5,373,139 | 12/1994 | Burgoon et al. ............... 219/137 R |

FOREIGN PATENT DOCUMENTS

| 0459021 | 12/1991 | European Pat. Off. . |
| 2175171 | 10/1973 | France . |
| 2187492 | 1/1974 | France . |
| 55-81086 | 6/1980 | Japan . |
| 58-181472 | 10/1983 | Japan ........................... 219/75 |
| 60-102591 | 6/1985 | Japan . |
| 60-191677 | 9/1985 | Japan . |
| 793734 | 1/1981 | U.S.S.R. ...................... 219/145.21 |

OTHER PUBLICATIONS

Patent Abstracts of Japan, vol. 7, No. 179 (M-234), Aug. 9, 1983 & JP-A-58081592 (Shimamoto Takijirou), May 16, 1983.

Bukarov et al., "Methods of Increasing the Durability of Tungsten Electrodes in Arc Welding", Welding International, vol. 31, No. 9, Sep. (1984), pp. 30-32.

Anisimov et al., "Evaluation of the Efficiency of Electrodes Made of Tungsten Doped with Lanthanum", Welding International, vol. 3, No. 2 (1989), pp. 102-104.

Patent Abstracts of Japan, vol. 6, No. 89 (M-132), May 27, 1982 & JP-A-57-025298 (Hitachi), Feb. 10, 1982.

Hirsch, D. J., "Narrow Groove Welding and Weld Monitoring with Adjustable Regionalized Filtration", EPRI BWR Reactor Vessel & Internals Inspection & Repair Workshop, Jul. 16-18, 1991, Charlotte, NC.

(List continued on next page.)

*Primary Examiner*—Clifford C. Shaw
*Attorney, Agent, or Firm*—James E. McGinness

[57] ABSTRACT

A welding process and an apparatus used therein for providing a significant improvement in the detrimental tensile residual stress condition on the root side of welds, especially on the inside wall of piping welds. The method combines an extremely thin weld joint design with a non-circular cylindrical, thin welding electrode having an elongated cross-sectional shape. During welding, the elongated dimension is aligned parallel with the length of the weld joint. This combination enables joining of piping and other residual stress-sensitive components with both the initial weld joint preparation and the completed weld having a uniquely thin width and with a high aspect ratio of depth to width. Use of this high-aspect-ratio weld joint process substantially mitigates welding-induced residual stresses, without the normally required internal water cooling. The process is considered to be effective in mitigating residual stresses and the associated welding strains (distortion) in joints having any path shape, whether welded from one or more sides of the material.

16 Claims, 4 Drawing Sheets

OTHER PUBLICATIONS

Wood et al., "Thick–Joint Welding Processes", Developments in Pressure Vessel Technology, vol. 3, Materials and Fabrication, Applied Sciences Publishers Ltd, Essex, England, 1980, pp. 145–194.

Cook et al., "Narrow Gap Welding with the Hot Wire GTA Process", Welding Journal, Aug. 1985, pp. 27–30.

Lucas, W., TIG and Plasma Welding: Process Techniques, Recommended Practices and Applications, Abington Press, Cambridge, England, 1990, pp. 73–79.

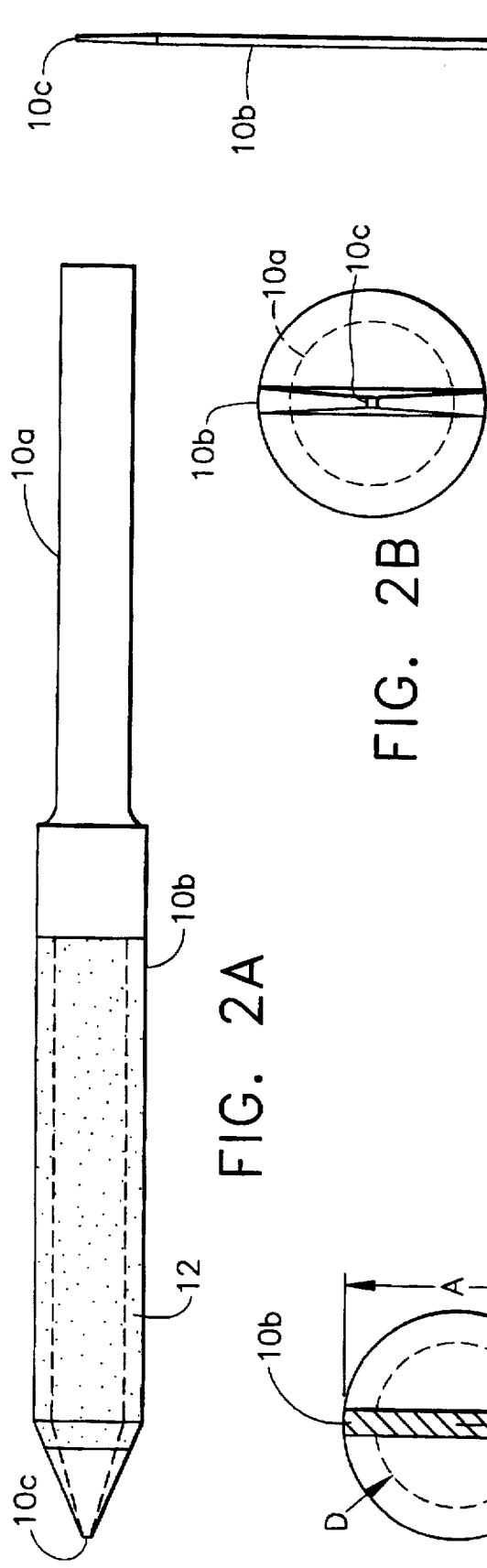
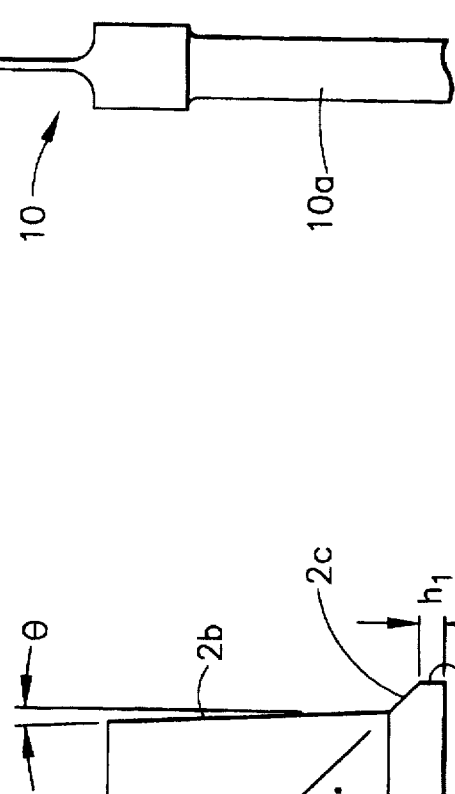
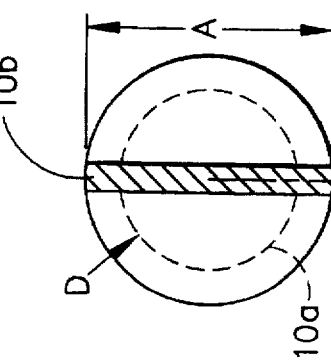

METHOD AND APPARATUS FOR JOINING METAL COMPONENTS WITH MITIGATION OF RESIDUAL STRESSES

FIELD OF THE INVENTION

This invention relates to the welding of piping and other residual stress-sensitive components. In particular, the invention relates to the welding of piping and other components used in nuclear reactors, which components are susceptible to stress corrosion cracking in the heat affected zones adjacent a weldment.

BACKGROUND OF THE INVENTION

A nuclear reactor comprises a core of fissionable fuel which generates heat during fission. The heat is removed from the fuel core by the reactor coolant, i.e. water, which is contained in a reactor pressure vessel. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental and radiation conditions. As used herein, the term "high-temperature water" means water having a temperature of about 150° C. or greater, steam, or the condensate thereof.

Some of the materials exposed to high-temperature water include carbon steel, alloy steel, stainless steel, and nickel-based, cobalt-based and zirconium-based alloys. Despite careful selection and treatment of these materials for use in water reactors, corrosion occurs on the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60 isotope.

Stress corrosion cracking (SCC) is a known phenomenon occurring in reactor components, such as structural members, piping, fasteners, and welds, exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC. The present invention is concerned with mitigating welding-induced residual stresses and thermal sensitization, which can lead to SCC in susceptible metals.

A conventional V-groove weld 6 for joining two pipes 2 and 4 is illustrated in FIG. 1A. The weld 6 is formed by filling the V-groove with beads of fused material from a filler wire placed at the tip of a circular cylindrical welding electrode (not shown). This welding process produces a very wide heat affected zone (HAZ) in the vicinity of the welded joint. The occurrence of SCC in the vicinity of such welded joints has led to the need for repair or replacement of much of the piping in light water reactor power plants throughout the world. Numerous methods have been utilized for over a decade to improve the tensile residual stress state in the vicinity of welded joints, including magnetic induction, electrical resistance and electric arc heating methods. All of these methods are based on generating a substantial temperature difference through the welded material thickness by applying the heat source on one side of the material and maintaining water cooling on the other side of the material. This temperature difference produces thermal strains and subsequent material plasticity, and a corresponding stress reversal across the thickness of the material. The net result makes the residual stress on the side of the joint exposed to the potentially aggressive reactor water environment significantly less tensile or, more preferably, compressive. These previous methods, including "heat sink welding" and "last pass heat sink welding", have all relied on continuous water convective cooling of the environmentally exposed side of the weld joint in order to effect the required temperature difference and stress reversal. This water cooling requirement is a severe penalty to the fabricator whether the piping is being newly installed or replaced, since the complete piping system must be intact in order to contain the water. The typically used arc welding process which requires water cooling to effect the temperature gradient through the material thickness and a corresponding residual stress reversal has relatively low thermal and time efficiencies and utilizes a wide weld joint design with a low aspect ratio of joint depth to thickness. The reduction of tensile forces residing in the metal lattice structure by internal water cooling during welding serves to mitigate the occurrence of irradiation-assisted SCC, wherein impurities in the stainless steel alloy diffuse to the grain boundaries in response to the impingement of neutrons.

A second major contributor to SCC in stainless steels alloyed with chromium for corrosion resistance is the size and degree of thermal sensitization of the heat affected zone adjacent to the weld. Thermal sensitization refers to the process whereby chromium carbides precipitate in the grain boundaries of the material. The precipitation of chromium carbides ties up the chromium which would otherwise be in solution. Thus, a thin layer along the grain boundary is denuded of chromium, creating a zone which is no longer corrosion resistant and therefore is susceptible to SCC. Such stainless steels corrode at the grain boundaries preferentially.

One consideration in the design of welds for SCC resistance is the minimization of the heat input by the process to the component being joined. This heat input is typically maintained at a level sufficient to provide reliable fusion by the weld filler metal to the side walls of the joint, which have in other welding processes been separated by an amount necessary to move a circular cylindrical electrode in the joint.

One type of reduced-groove-width welding process used commercially in power plant piping welds is so-called "narrow groove" welding, an illustration of which is given in FIG. 1B. This technique produces a weld 6' between pipes 2' and 4' which has a heat affected zone which is narrower than and a groove angle which is less than the HAZ and groove angle of the V-groove welding process. The "narrow groove" welding process uses a standard circular cylindrical electrode geometry. These standard electrodes come in various lengths and diameters, typically with a relatively pointed or conical end. However, in "narrow groove" welding, the reduction of the groove width has been limited by the minimum diameter of the electrode required to reliably carry the needed welding current. All previous welds, including "narrow groove" welds, have been made with the circular cylindrical electrode shape, which has become the industry standard. The minimum diameter of a circular cylindrical

3 electrode is in turn limited by the electrical current-carrying and heat-dissipating capability of a given size. No provision has ever been made for the manufacture or installation of a noncylindrical electrode in either a V-groove or "narrow groove" weld application.

SUMMARY OF THE INVENTION

The present invention is a process and an apparatus for significantly improving the detrimental tensile residual stress condition on the root side of welds, especially on the inside wall of piping welds. The process combines an extremely thin weld joint design with a non-circular cylindrical, thin welding electrode having an elongated cross-sectional shape. During welding, the elongated dimension is aligned parallel with the length of the weld joint. This combination enables joining of piping and other residual stress-sensitive components with both the initial weld joint preparation and the completed weld having a uniquely thin width and with a high aspect ratio of depth to width. Use of this high-aspect-ratio weld joint process substantially mitigates welding-induced residual stresses, without the normally required internal water cooling. The process is effective in mitigating residual stresses and the associated welding strains (distortion) in joints having any path shape, whether welded from one or more sides of the material. The welding process of the invention also reduces the heat input into the heat affected zones, thereby mitigating thermal sensitization of the welded joint.

The present invention is a highly thermal and time efficient welding process for application on all piping and other types of components wherein the conductive self-cooling effects of the base metal alone, when combined with a very thin weld joint design, are capable of significantly improving the residual stress of component weld joints without the need for water or other cooling of the component during the welding. Due to the combined high heating efficiency, the high heating and cooling rates, the thin joint design of the disclosed process, and the corresponding small size of each weld pass, the required temperature gradient and thermal stress, and resulting improved residual stress distribution are established through the thickness of the material being welded. The final levels of residual stresses are established as the outer passes of the joint are completed.

BRIEF DESCRIPTION OF THE DRAWINGS

FIGS. 2A–2C are front, side and bottom views respectively of the electrode geometry in accordance with the preferred embodiment of the present invention.

FIG. 3 is a schematic showing the details of the blade geometry shown in FIG. 2C.

FIG. 4 is a sectional view of the groove geometry of a portion of a pipe to be joined in accordance with the welding technique of the present invention.

4

DETAILED DESCRIPTION OF THE PREFERRED EMBODIMENTS

Figure 1C:
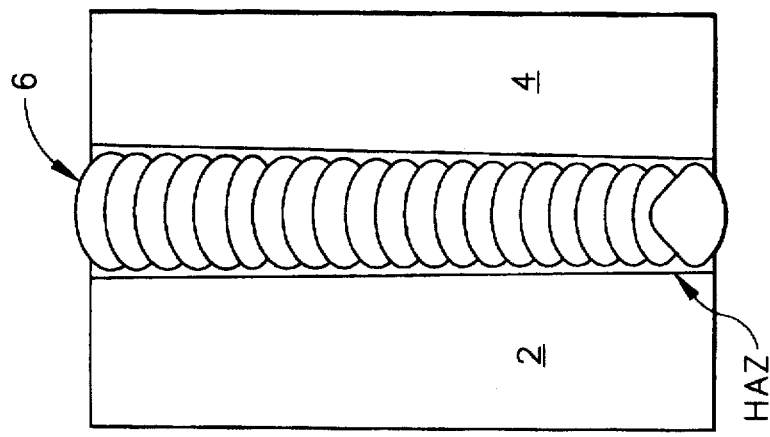
FIG. 1C is a sectional view of a joint welded in accordance with the technique of the present invention.

The welding equipment in accordance with the preferred embodiment of the invention comprises a conventional gas tungsten arc welding (GTAW) system with mechanized torch movement which is used in conjunction with a unique tungsten electrode geometry. The welding process in accordance with the invention comprises the step of creating a unique weld joint geometry, the welding of which is made possible by the novel electrode shape and made practical by other special features of this welding process. In accordance with the weld joint geometry of the invention, the groove between pipes 2 and 4 preferably has an acute angle less than 5° which is filled with weld material having a reduced width which requires less heat to achieve fusion. The result is a heat affected zone which in narrower than that produced by "narrow-groove" welding, as seen in a comparison between FIGS. 1B and 1C.

In contrast to conventional electrodes, the unique electrode geometry of the present invention is a cylinder having an elongated non-circular cross-sectional shape with the elongated dimension being oriented parallel to the length of the weld joint and with the shortened dimension being oriented perpendicular to the length of the joint. For a given cross-sectional area, the thin electrode geometry of the present invention provides an electrode having a dimension (i.e., the width) which is less than the diameter of a circular cylindrical electrode of equal cross-sectional area. This thinner dimension and its orientation enables the electrode of the present invention to enter thin grooves which a conventional circular cylindrical electrode is too wide to enter. Accordingly, the width of the joint to be welded can be made significantly smaller than is the case were a circular cylindrical electrode to be used, while maintaining the cross-sectional area of the electrode approximately constant. Maintenance of the cross-sectional area of the electrode is very important in order to control the current density, Joule heating, and conductive cooling in the electrode during welding. The required mechanical strength of the electrode is also maintained with a constant cross-sectional area. Further, the use of a noncylindrical, thin electrode in accordance with the present invention allows the weld heat input to be significantly reduced for each pass, and therefore the size and sensitization of the heat affected zone is correspondingly reduced.

The elongated cross-section electrode used in the welding process of the invention is basically not limited in how thin it can be, and therefore how thin the weld joint can be, as long as the cross-sectional area of the welding electrode is approximately constant and there is clearance to the walls of the joint for forward travel.

The preferred embodiment in accordance with the invention is a flat tungsten alloy electrode having the geometry shown in FIGS. 2A–2C. Electrode 10 comprises a circular cylindrical shank 10a, a non-circular cylindrical blade 10b and a tip 10c. Blade 10b is optionally covered with an insulating coating. All sharp corners are radiused to prevent arcing. The cross section of blade 10b preferably has the shape of a rectangle with rounded corners. The details of the blade dimensions are shown in FIG. 3. Blade 10b has a width A, a thickness B and a half-thickness C, while the shank 10a has a diameter D. The dashed lines visible in FIG. 2A indicate an alternate blade shape when A=D. The dimensions A through D (in inches) for four exemplary electrodes are given in the following table:

| Dimension | Type 1 | Type 2 | Type 3 | Type 4 | Type 5 |
|---|---|---|---|---|---|
| A | 0.125 | 0.125 | 0.1875 | 0.1875 | 0.250 |
| B | 0.060 ± 0.005 | 0.045 ± 0.005 | 0.045 ± 0.004 | 0.030 ± 0.004 | 0.025 ± 0.002 |
| C | 0.030 ± 0.002 | 0.0225 ± 0.002 | 0.015 ± 0.002 | 0.015 ± 0.002 | 0.0125 ± 0.001 |
| D | 0.125 | 0.125 | 0.125 | 0.125 | 0.125 |

In accordance with the concept of the present invention, the dimensions A–D can be varied over wide ranges and are not restricted to the values set forth in the table. Preferably, the ratio A to B is at least 1.5:1.

A preferred embodiment of a groove geometry of a pipe 2 to be joined using the welding technique of the present invention is depicted in FIG. 4. The pipe has a wall thickness t. The end face of the pipe comprises a land 2a, which is an annular radial surface extending outward from the inner circumference of the pipe, and a beveled surface 2b, which is a conical surface extending radially outward at an angle θ relative to the radial plane. In accordance with the present invention, θ is preferably less than 5° and may be as small as 0°. An extension surface 2c connects the outer periphery of land 2a with the inner periphery of beveled surface 2b. Extension surface 2c may be either a circular cylindrical surface (not shown) or a conical surface, e.g., having an angle of 45° as shown in FIG. 4. The height of land 2a is designated by $h_1$; the height of extension 2c is designated by $h_2$.

The welding technique of the present invention was successfully applied on 6- and 14-inch-diameter pipe made of Type 304 stainless steel in the horizontal position. The 6-inch-diameter pipe had a wall thickness t=0.432 inch; the 14-inch-diameter pipe had a wall thickness t=1.25 inch. For the purpose of test welding only, the bevel angle θ was selected to be equal to one of the following: 0°, 2°, 3°, 3.5° and 4°. The land height $h_1$ was varied from 0.030 to 0.070 inch; the extension height $h_2$ was varied from 0.090 to 0.156 inch.

Figure 5A:
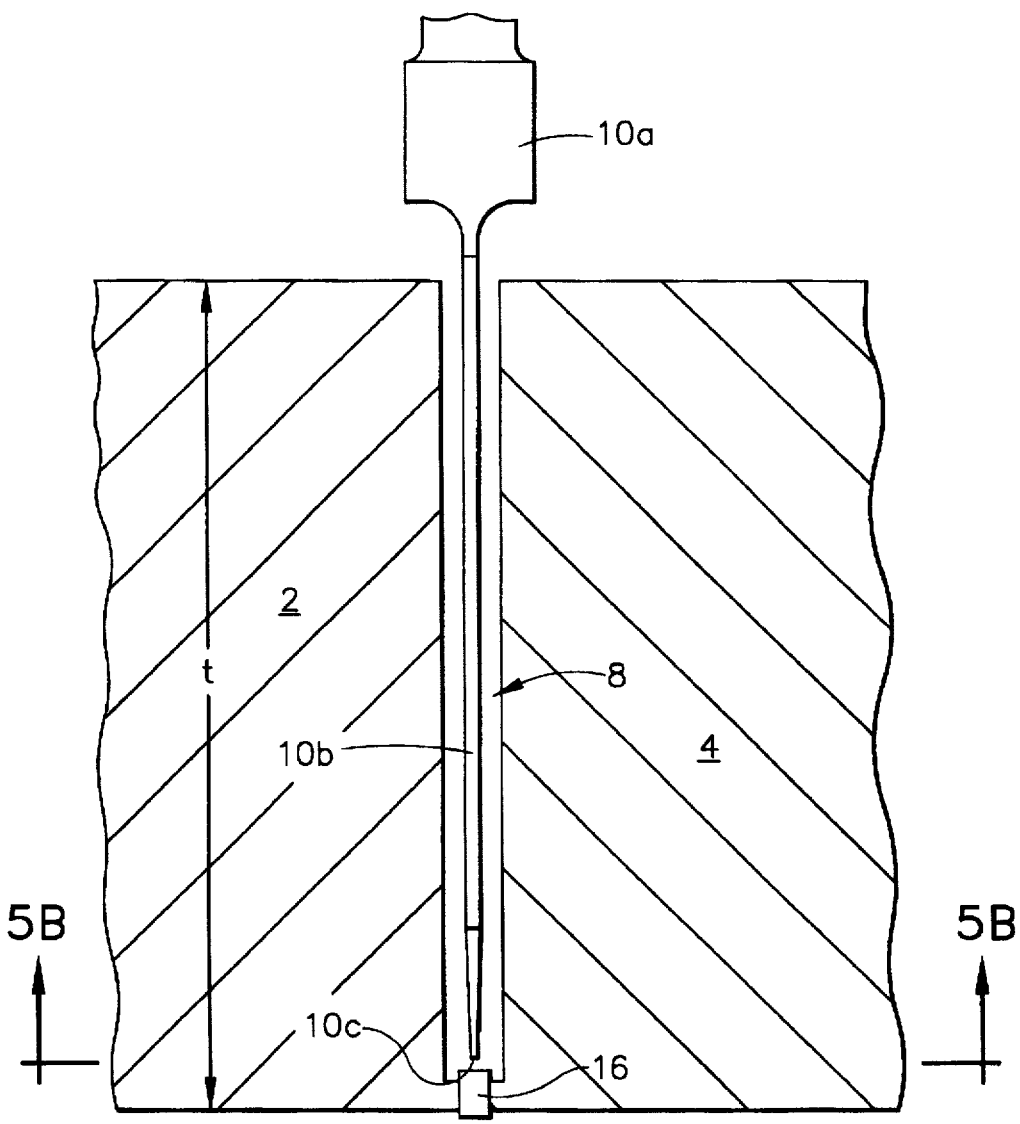
FIGS. 5A and 5B are side and top views respectively of a joint and welding equipment assembly in accordance with a preferred embodiment of the present invention.
Figure 5B:
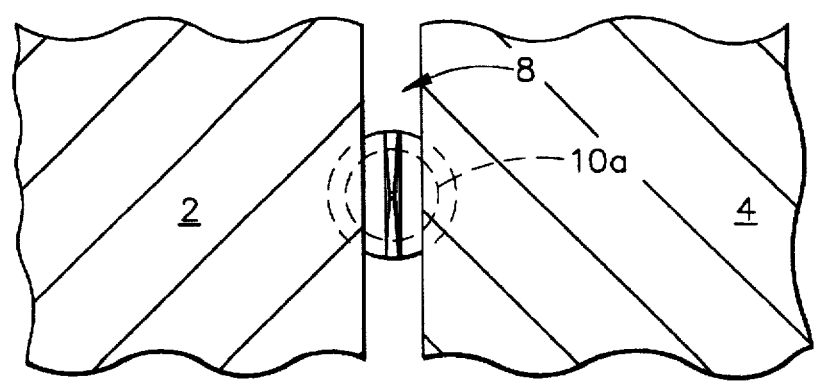
Figure 6:
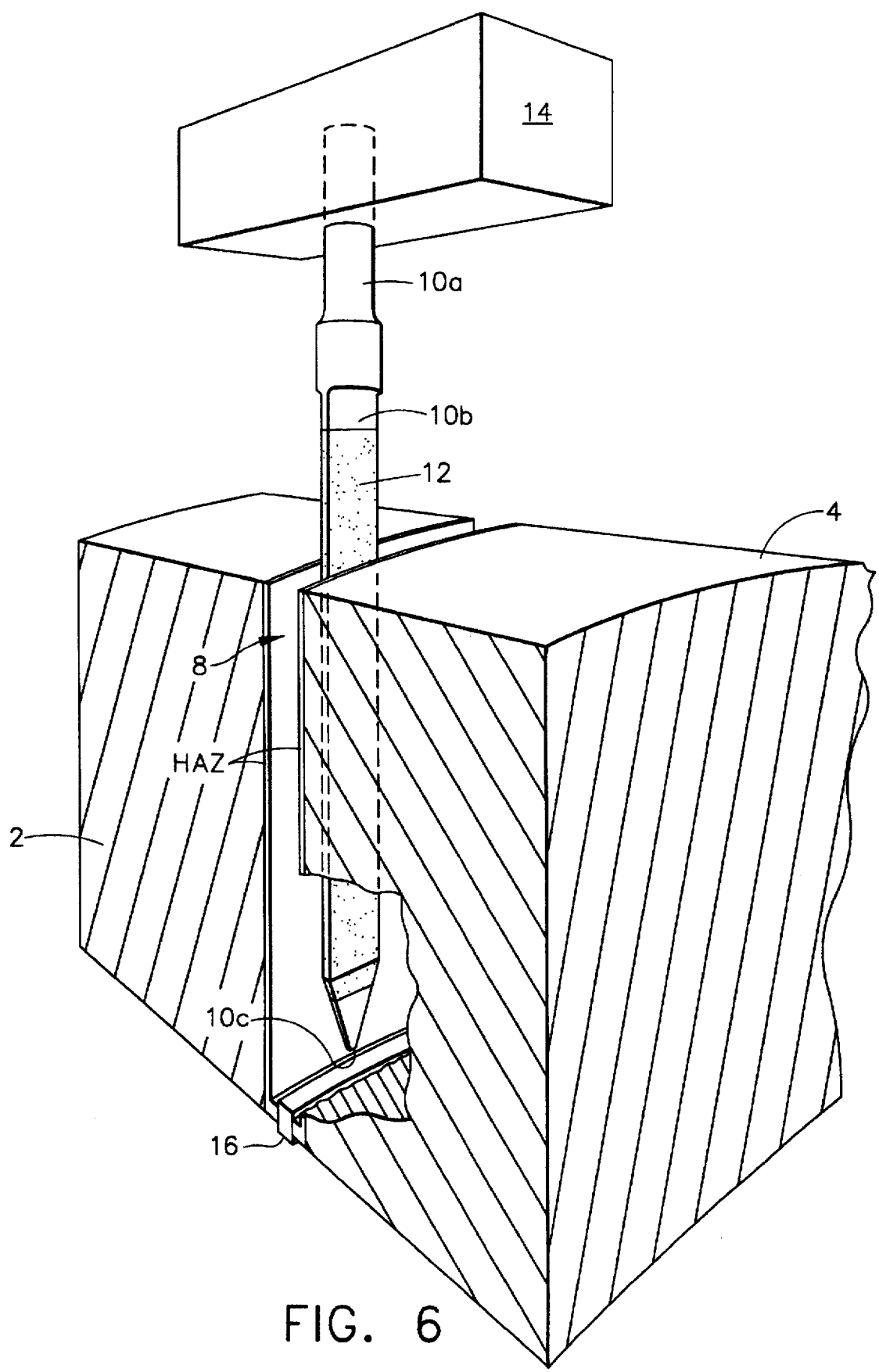
FIG. 6 is a schematic perspective view showing a joint and welding equipment assembly in accordance with the present invention.

During welding, two pipes 2 and 4 are placed end to end in a horizontal position with a groove 8 therebetween, as depicted in FIGS. 5A, 5B and 6. In this case, the groove 8 has parallel sidewalls, i.e., the bevel angle θ=0°. A consumable ring-shaped insert 16, having, e.g., a 1/16-inch×1/8-inch cross section and having the same composition as the filler wire, was placed between the lands of opposing pipe ends at the root of groove 8 to compensate for any radial mismatch of the lands. During the first (root) pass, the groove between pipes to be joined must be bridged. The lands and the consumable insert provide material which is fused together to form the weld root. After the root pass, a hot (second) pass is made, followed by a number of filler passes and a cover (last) pass.

Figure 1B:
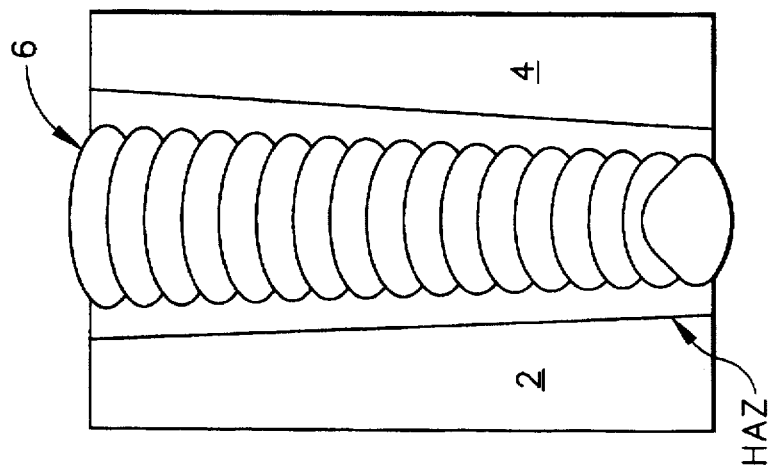
FIG. 1B is a sectional view of a narrow-groove joint welded in accordance with another conventional welding technique.
Figure 1A:
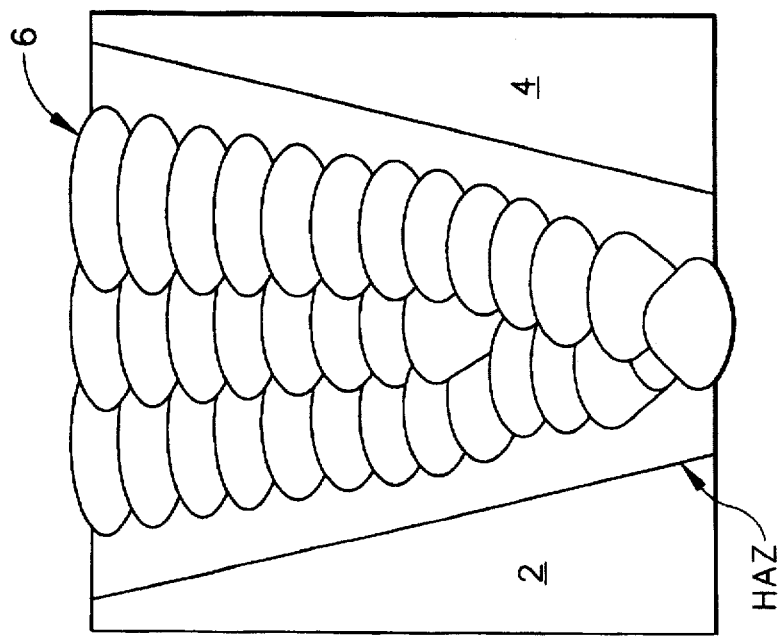
FIG. 1A is a sectional view of a V-groove joint welded in accordance with a conventional welding technique.

The weld beads are deposited inside the groove using a thin elongated tungsten alloy electrode 10 to melt the filler wire fed into the groove. Electrode 10 has the geometry shown in FIGS. 2A–2C and fits inside groove 8 with clearance between the electrode and the sidewalls as shown in FIG. 5B. Blade 10b of electrode 10 is covered with a ceramic coating 12 (see FIG. 5A) to prevent arcing to the side walls of groove 8. The electrode is electrically coupled to a conventional welding torch 14. The flat electrode in conjunction with the small bevel angle and selected welding parameters produce a very thin weld joint, as shown in FIG. 1C.

The very thin weld joint which is made practical with the welding process using the elongated cross-section electrode allows the two surfaces being joined to be in closer proximity to each other, so that both of them are simultaneously wetted by a smaller molten weld pool with a significantly lower heat input rate (improved thermal efficiency) than is otherwise possible. This reduction in heat input per weld pass to the deposited filler material and base materials being welded allows the size and temperature of the heat affected zone (HAZ) adjacent to the fused zone to be significantly reduced, with the benefit of a corresponding reduction in SCC sensitivity of susceptible materials. As a result, the temperature gradient through the thickness of the component being welded is much steeper, since the gradient is controlled by the relatively constant high temperature of the molten metal, and the reduced low temperature of the far surface of the component (also known as the "root" or first pass of the weld). The steeper temperature gradient through the component which is achieved with the very thin weld joint of the invention also leads to the benefit of generating a less tensile or, preferably, a compressive residual stress state at the root of the weld. This improved stress state also leads to a reduction in SCC sensitivity of susceptible materials. The combined effects of the reduced thermal sensitization (i.e., carbide precipitation) in the heat affected zones and of the improved stress state at the root of the weld provide a significant increase in SCC resistance of a welded joint exposed to an aggressive environment.

The use of a welding gas with a lower electrical resistance in the ionized state in the welding process, such as a blend of argon and hydrogen and/or helium, rather than pure argon, allows the arc length (between the end of the electrode and the bottom of the weld joint) to be reduced, ensuring that the arc does not transfer to the walls of the joint which are closer to the electrode than is the case in other welding processes. An alternate method specified in the welding process to prevent the arc from transferring to the walls of the joint is to coat the surface of the electrode, except for the tip where the arc is intended to be transferred, with a material such as a ceramic having a greater resistance to ionize the welding gas blend. This provision helps to ensure that the edges (geometric discontinuities) of the electrode along its length are not arc transfer locations which are more favorable than the electrode tip. This method also eliminates the need to insert an electrically insulating gas cup extension into the joint, as is practiced in some other wider joint welding processes.

Another related benefit of the reduced heat input, size and temperature of the heat affected zone in accordance with the present invention is a reduction in or elimination of grain growth during welding. Significant grain growth in the heat affected zone and the corresponding thermal sensitization in this area leads to the "knife line attack" form of SCC in materials which are otherwise resistant to SCC, such as the stabilized grades of austenitic stainless steel.

The improved residual stress state at the root of a joint made by the welding process of the present invention, relative to the conventional joint welded with a wider groove and a circular cylindrical electrode, is generated by a stress reversal during the welding process. During the welding, the hot, weakened heat affected zone and recently solidified weld metal are plastically compressed due to their thermal expansion relative to the cooler and stronger surrounding material. Upon cooling, this compressed zone contracts against the surrounding material and is put in a state of tensile residual stress. The contraction and corresponding tensile stresses are balanced by the surrounding material, in particular the weld root, going to the desired state of less tensile or to a more desirable compressive stress. The degree of stress improvement depends on the particular welding process parameters used. A key factor in making the welding process effective in generating significantly reduced heat affected zone sensitization and root tensile residual stresses without water cooling (external heat sinking) of the component being welded is the very low heat input capability of the process (and corresponding internal heat sinking), made possible by the very thin joint geometry and in turn by the thin, non-circular welding electrode shape.

Another benefit of the reduction in the tensile residual stresses at the root of a joint made with the welding process in accordance with this invention is a decrease in the susceptibility of materials exposed in an irradiation environment to the mechanism of irradiation-assisted stress corrosion cracking (IASCC). This beneficial effect arises due to the retardation of diffusion of the detrimental elements to internal interfaces, which is assisted by the influence of higher tensile residual stresses.

Some of the welding process parameters which control the thermal efficiency of the process include the arc gas composition, the torch travel speed, and the arc current and current pulsing values. These and other parameters have been modified for the inventive welding process beyond their normal ranges for V-groove or "narrow-groove" welding in order to further the minimization of the heat affected zone and the root tensile residual stress. Measurements of the pipe diameter and axial length revealed that shrinkage was reduced, resulting in less tensile stress.

Different inert gas mixtures were tested as the shield gas, including: (1) 50% argon-50% helium; (2) 98% argon-2% hydrogen; and (3) 95% argon-5% hydrogen. The mixture of argon and hydrogen increases the temperature of the arc, causing the weld puddle to wet the substrate more quickly. Because of the high energy density, the skin of the substrate is heated quickly, leaving no time for the conduction of heat below the skin. This produces a thinner heat affected zone than is conventionally known. The addition of hydrogen also shortens the arc, so that less clearance to the side walls is needed.

Further, the torch travel speed during test welding was varied between 2 and 10 inch/min. The higher torch travel speeds allow the puddles of weld material to freeze quickly.

During development of the welding process, for the root (first) pass the arc current was 90 to 115 amps for the first pulse and 60 to 70 amps for the second pulse; for the hot (second) pass the arc current was 115 to 170 amps for the first pulse and 50 to 70 amps for the second pulse; and for the fill passes the arc current was 170 to 220 amps for the first pulse and 70 to 110 amps for the second pulse. Various pulsing schemes were tried.

The foregoing process and apparatus have been disclosed for the purpose of illustration. Variations and modifications of the disclosed process and apparatus will be readily apparent to practitioners skilled in the art of welding. All such variations and modifications which do not depart from the concept of the present invention are intended to be encompassed by the claims set forth hereinafter.

We claim:

1. A welding electrode comprising a blade having an axis and a tip, wherein said tip is joined and electrically connected to one end of said blade, said blade is a cylinder having a generally rectangular cross section and having a thickness dimension in a thickness direction perpendicular to said axis and a width dimension in a width direction perpendicular to said thickness direction and to said axis, the ratio of said width dimension to said thickness dimension is at least 1.5:1, and said tip is a solid body comprising first, second and third faces, said first face being perpendicular to said blade axis, said second face being disposed obliquely relative to said first face, said third face being disposed obliquely relative to said first face and being non-parallel with said second face, said second and third faces being trapezoidal in shape, said first and second faces being joined at a first linear juncture, said first and third faces being joined at a second linear juncture, said blade and said second face being joined at a third linear juncture, said blade and said third face being joined at a fourth linear juncture, said first through fourth linear junctures being mutually parallel.

2. The welding electrode as defined in claim 1, wherein said tip has the shape of a truncated pyramid.

3. The welding electrode as defined in claim 1, further comprising a shank having one end joined and electrically connected to another end of said blade, wherein said shank has a circular cross section.

4. The welding electrode as defined in claim 1, wherein said blade is coated with electrically insulating material.

5. The welding electrode as defined in claim 4, wherein said electrically insulating material is ceramic.

6. The welding electrode as defined in claim 1, wherein said blade is made of tungsten alloy.

7. A method for joining first and second metal components in a depthwise direction, said first and second metal components in an unjoined state having first and second sidewalls respectively which are separated by a groove having at least a predetermined width, comprising the steps of continuously feeding weld material in the vicinity of a tip of an electrode which travels at a selected travel speed during a particular weld pass, continuously melting said weld material inside said groove by discharging electric current from a tip of said electrode in accordance with selected welding parameters while said electrode travels at said selected travel speed, and solidifying said melted weld material to form fused beads said electrode comprising a blade having an end joined and electrically connected to said tip, said blade having a non-circular cross section with a first dimension in a first direction and a second dimension in a second direction, said first and second directions being mutually perpendicular, said first dimension being less than and said second dimension being greater than said predetermined width of said groove, wherein a predetermined number of weld passes collectively produce a final residual stress state which is substantially compressive substantially across said weld joint and heat affected zones thereof, said compressive residual stress state being attained without the use of an external heat sinking medium to extract inputted heat during any of said weld passes.

8. The method as defined in claim 7, wherein said first and second metal components are pipes and said groove is an annular groove separating said pipes, and said electrode tip travels circumferentially inside said annular groove during melting of said weld material at a speed greater than 5 inches per minute.

9. The method as defined in claim 7, wherein said electrode tip travels inside said groove during melting of said weld material at a speed greater than 5 inches per minute.

10. The method as defined in claim 7, wherein said groove has a bevel angle which is less than 5°.

11. The method as defined in claim 7, wherein the ratio of said second dimension to said first dimension is at least 1.5:1.

12. The method as defined in claim 7, wherein said steps of melting and solidifying said weld material are performed in an inert gas atmosphere comprising hydrogen or helium or both.

13. A weld joint for joining first and second metal components in a depthwise direction, said first and second metal components in an unjoined state having first and second sidewalls respectively which are separated by a groove having at least a predetermined width, said weld joint being made by a process comprising the steps of continuously feeding weld material in the vicinity of a tip of an electrode traveling at a selected travel speed, continuously melting said weld material inside said groove by discharging electric current from said tip of said electrode in accordance with selected welding parameters while said electrode travels at said selected travel speed, and solidifying said melted weld material to form fused beads, wherein a predetermined number of weld passes collectively produce a final residual stress state which is substantially compressive substantially across said weld joint and heat affected zones thereof, said compressive residual stress state being attained without the use of an external heat sinking medium to extract inputted heat during any of said weld passes.

14. The weld joint as defined in claim 13, wherein said first and second metal components are pipes and said groove is an annular groove separating said pipes, and said electrode tip travels circumferentially inside said annular groove during melting of said weld material.

15. The weld joint as defined in claim 13, wherein said groove has a bevel angle less than 5°.

16. The weld joint as defined in claim 13, wherein said steps of melting and solidifying are performed in an inert gas atmosphere comprising hydrogen or helium or both.

* * * * *